Figure 1:
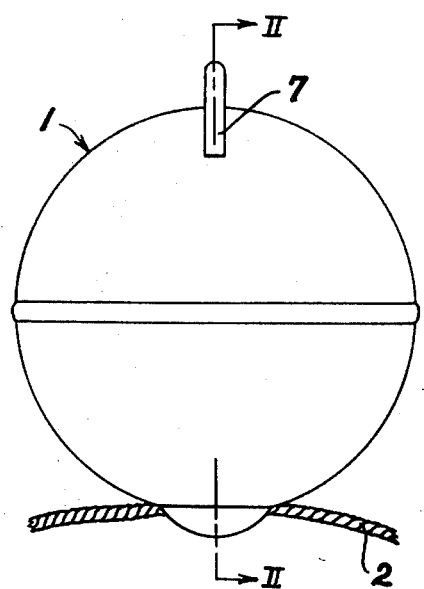

United States Patent

[11] 3,589,053

| [72] | Inventor | Hartman Fynbo Norgardsvey 12, Strandby, Denmark |
|---|---|---|
| [21] | Appl. No. | 739,485 |
| [22] | Filed | June 24, 1968 |
| [45] | Patented | June 29, 1971 |

[54] FLOAT FOR NET-FORMED FISHING TACKLE
1 Claim, 3 Drawing Figs.

[52] U.S. Cl. .................................................. 43/44.92
[51] Int. Cl. ................................................. A01k 93/00
[50] Field of Search ......................................... 43/44.87, 44.93, 44.92, 43.1, 44.9, 44.91, 44.95, 14, 7, 9

[56] References Cited
UNITED STATES PATENTS

| 2,764,838 | 10/1956 | Singer | 43/44.91 |
| 3,037,319 | 6/1962 | Stanek | 43/44.95 |
| 1,264,833 | 4/1918 | Mansbendel | 339/272 |
| 2,379,676 | 7/1945 | Blackstone | 43/44.93 X |
| 2,975,541 | 3/1961 | Birrell | 43/44.93 X |
| 3,105,318 | 10/1963 | Birrell | 43/44.87 X |

Primary Examiner—Warner H Camp
Attorney—Synnestvedt & Lechner

ABSTRACT: A float consisting of a float member and an attachment member, one of which is provided with an open groove for receiving a rope for fishing tackle to be secured to the float. When the two members are assembled, the groove will form a through passage. One member is provided with external threads releasably engaging corresponding internal threads on the other member thereby securely holding ropes of various thicknesses without the use of tools or other components.

PATENTED JUN29 1971 3,589,053

FLOAT FOR NET-FORMED FISHING TACKLE

The invention relates to a float for net-formed fishing tackle consisting of a preferably hollow float member and an attachment member which can be removably assembled around a rope on fishing tackle, one of the members being provided with an open groove for the rope, said groove being closed so as to form a through passage when the members are assembled.

Several different net globes and other float members designed for fishing tackle are known, which are made from glass, plastic material or metal. Usually, the net globes have one or more attachment portions with a through hole, through which an extra line is drawn, which said line may thereupon be secured to the upper line of a trawl or other fishing tackle.

Net globes of the said character in which an extra line must be drawn through a hole in the globe suffer from a number of disadvantages. Thus, the extra line must be tied with a very hard and solid knot, but there is still a possibility that it may come undone. A sufficiently secure mounting requires much work and is difficult, especially in cold weather. As often as not the attachment lines must be cut off when a globe is to be dismounted, as it may be very difficult to untie the knots, thus causing consumption of expensive material.

Floats are known in which the said disadvantages are avoided by the use of screw connections to attach the float to the rope. This requires special tools, and the individual parts for the attachment may easily be lost when the float is removed.

Furthermore, floats are known in which a keying is used for the attachment of the rope. However, during fishing a net globe will be subjected to forces working in all directions, and a key will therefore be exposed to such an influence that the hold is loosened. A self-locking keying permits only a slight movement of the members across the longitudinal direction of the key and is therefore only suitable for ropes of a certain thickness.

The object of the present invention is to provide a float which permits a solid and secure attachment of ropes of different thicknesses without the use of other components and tools.

According to the invention this object is achieved by providing one member with external, preferably self-locking threads which are in releasable threaded engagement with corresponding internal threads on the other member. Thus, the two members constituting the float are themselves provided with threads, and when they are screwed together, without the use of tools, a rope or a line of practically any thickness can be securely held, especially if the threads are self-locking.

According to the invention the groove may have such a shape that its cross section is gradually reduced toward its bottom, when the members are screwed together.

According to the invention the groove for the rope is suitably provided in the part of one member having the external threads and extends across the axis of the threads through said part. The attachment and removal of the rope is thereby facilitated.

According to the invention, in a globular float the float member may have a countersunk nut portion whilst the attachment member may have the form of a screwplug. This ensures that the members when screwed together constitute a float which is as globular as possible. In a globular float it may in certain cases be particularly expedient that, according to the invention, the float member has a radially protruding threaded projection whilst the attachment member is in the form of a nut.

In order to facilitate the manual turning of the members when they are screwed on and off, one or both members may, according to the invention, have a handle which according to the invention is preferably in the form of a rib extending in a plane through the axis of the threads.

Either portion of the float may advantageously be produced from plastic material.

Figure 2:
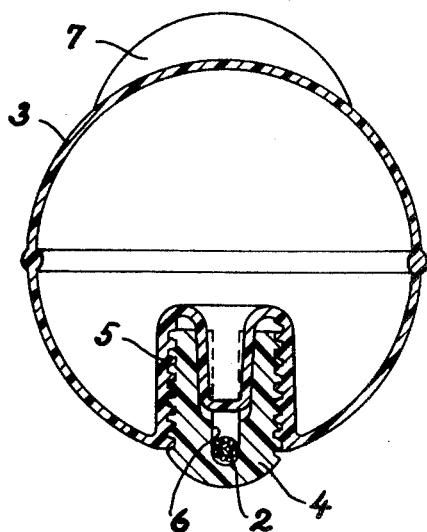

Two embodiments of the invention are shown in the drawing:

FIG. 1 showing a net globe as seen from the side and attached to a line,

FIG. 2 a section on the line II–II in FIG. 1, and

Figure 3:
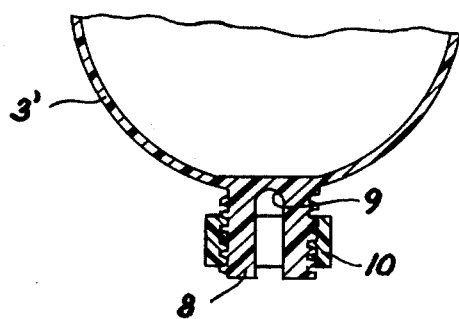

FIG. 3 a portion of a float member according to a second embodiment of the invention in section corresponding to FIG. 2.

In the embodiment of the invention shown in FIGS. 1 and 2, a net globe 1 is attached to the upper line 2 of a piece of fishing tackle, the net being secured to said line. The net globe 1 consists of a hollow, preferably globular portion 3 providing the desired buoyancy, and a screwplug 4 which may be screwed into a countersunk nut portion 5 in the globe 3. The screwplug 4 has a deep groove 6 to receive the line 2 when the plug has been unscrewed. When the plug 4 is screwed down, the groove 6 will be closed and form a through passage from which the line cannot be removed sideways. Simultaneously, it will also be held securely against longitudinal displacement, being squeezed between the plug 4 and the place on the globe 3 next to the nut portion 5. A rib 7 may be provided on the globe 3 opposite the nut portion 5, said rib serving as a handle when the globe 3 and the plug 4 are screwed together. If desired, the handle may be let into the globe. Also the plug 4, which is screwed into the globe, may be provided with a handle; however, such a handle has not been shown in the drawing, and it is not necessary either, as this member can be securely held by means of the line itself, when same rests in the groove in the plug.

FIG. 3 shows an embodiment, wherein a hollow, globular portion 3', affording the required buoyancy, is provided with a screw portion 8 with a deep groove 9. A nut 10 is arranged to be screwed around the screw portion 8, so that the groove 9 is closed to form a through passage, into which the line is squeezed.

I claim:

1. A float assembly adapted for use in combination with net-formed fishing tackle comprising a buoyant globe shaped float member having an internally threaded nut element countersunk in the surface thereof without impairment of the buoyancy and positioned so that the thread axis lies on a radius of the globe and with the threaded bore open to the surface, a plug member having external threads on one end that can mate with the threads of the nut, the thread system being self-locking, the threaded plug end having a slot extending transversely across the plug on a diameter of the thread axis and having a cross section that gradually reduces towards its bottom, said slot being dimensioned to receive tackle ropes of varying sizes when the nut and plug are disengaged, and to form an eyelike through passage for the rope that can be gradually constricted in both depth and width by threading the plug into the nut and thereby simultaneously wedge the rope against the slot bottom in the zone of reduced cross section and float surfaces peripherally adjacent the bore of the nut element so as to prevent both lateral and longitudinal displacement of the rope, and a handle, to facilitate turning of the float relative to the plug, secured to the float at a point on the float surface diametrically opposed to the nut element.